Dec. 13, 1955
A. CRESSWELL
2,726,769
CANDLE FILTER
Filed Dec. 6, 1950
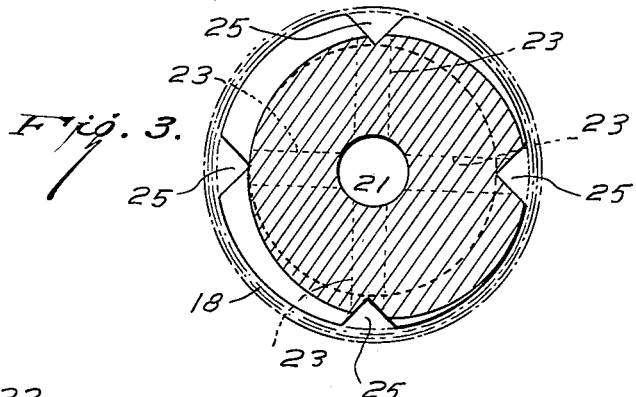
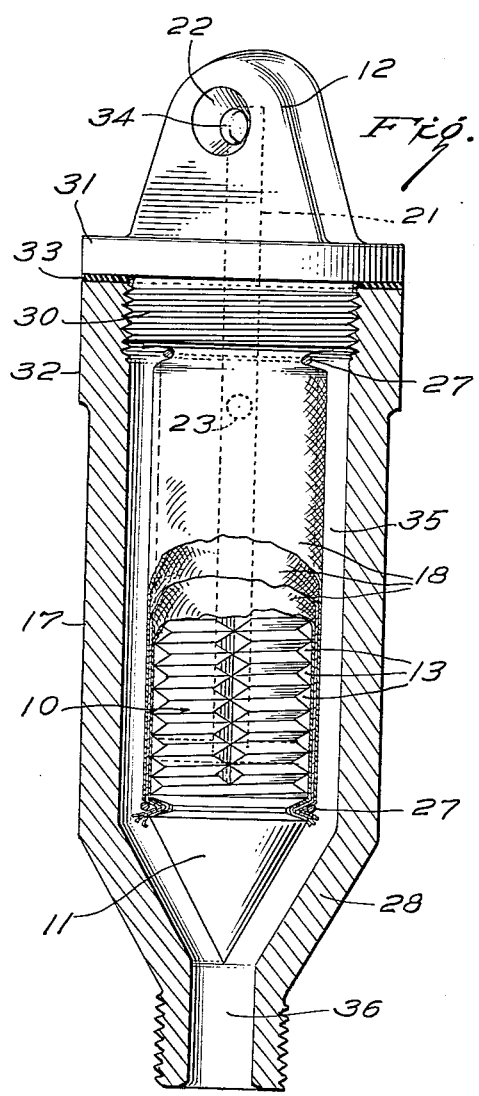
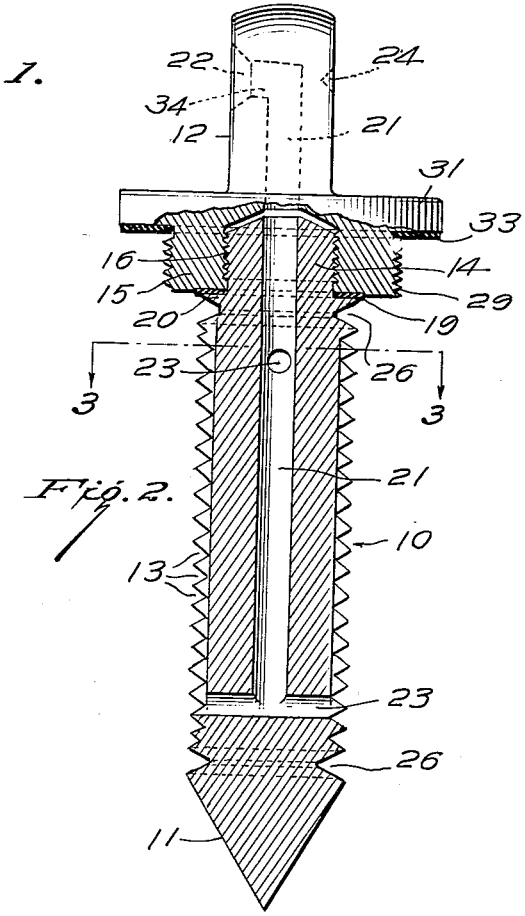
INVENTOR
ARTHUR CRESSWELL,
BY
Harold L. Kauffman
ATTORNEY United States Patent Office 2,726,769
Patented Dec. 13, 1955

2,726,769

CANDLE FILTER

Arthur Cresswell, Stamford, Conn., assignor to American Cyanamid Company, New York, N. Y., a corporation of Maine Application December 6, 1950, Serial No. 199,474

6 Claims. (Cl. 210—164)

This invention relates to an improved filter or filter unit, and more particularly is concerned with an improved filter of the kind commonly known as a "candle filter."

Candle filters are now widely used in the production of synthetic filaments or fibers of various kinds, such as the various rayon fibers, where they are employed to filter the cellulosic solution (or other spinning solution to be spun) prior to extrusion under pressure through a spinneret or jet to form a filament, ribbon, tape or the like by known means. Such filters, however, are capable of being used for the filtration of all liquids.

The candle filters heretofore used or suggested for use in the filtration of spinning solutions have been so designed and constructed that an excessive amount of air was entrapped and retained in the filter when operations were started. Substantially all of such air has to be removed from the filter in order to obtain a spinning solution which is free from entrapped air and will spin satisfactorily. This has necessitated prolonged "bleeding" of the filter prior to spinning, which not only is very time-consuming and decreases the productive capacity of a given spinning unit, but also results in the loss of substantial amounts of expensive spinning solution.

The foregoing difficulties and objects to conventional candle filters are considerably enhanced when the solution is very viscous, such as in the case of certain solutions of an acrylonitrile polymerization product, e. g., high-viscosity solutions of polymeric or copolymeric acrylonitrile dissolved in a concentrated aqueous solution of a water-soluble salt which yields highly hydrated ions in an aqueous solution, for instance, sodium thiocyanate. Examples of such solutions are given in, for instance, my copending application Serial No. 772,200, filed September 4, 1947, now Patent No. 2,558,730 dated July 3, 1951. The improved candle filter of the present invention is particularly useful in the filtration of such solutions of an acrylonitrile polymerization product prior to spinning thereof.

The novel features of my invention are set forth in the appended claims. The invention itself, however, will best be understood by reference to the following more detailed description when considered in connection with the accompanying drawing illustrating a preferred embodiment of my invention, and in which Fig. 1 is an elevation of my new filter, showing the filter core and filter medium in position within the casing (shown in section), while the filter medium has been partly broken away in order to show the filter core; Fig. 2 is a sectional and partly elevational view of the filter core and of the base which is joined to the core; and Fig. 3 is a cross-sectional view taken along the line 3—3 of Fig. 2.

It is a particular feature of my improved candle filter that the filter core is terminated by a conical-shaped extension at the end thereof opposite the end which is joined to the base through which the spinning solution to be filtered is introduced; and that the portion of the filter casing or mantle enveloping this extension has, at least on its inner surface, a conical shape approximating (and, preferably, corresponding to) the conical shape of this extension. By this specific construction, I am able to obviate or minimize the difficulties and objections to conventional candle filters that were mentioned in the third and fourth paragraphs of the specification.

I am aware that it has been suggested to construct a candle filter with the filter core rounded somewhat at the end nearest the inlet of the solution to be filtered. Such a construction is shown in, for example, French Patent No. 699,299. The design of the candle filter there shown is materially different from the improved candle filter of my invention and has no provision similar to, or the equivalent of, the conical-shaped extension of the core and corresponding shape of the mantle or casing enveloping this extension, which features are embodied in my candle filter. Furthermore, the design of the candle filter shown in the aforementioned French patent is such that the flow of the liquid through the filter is in the reverse direction from that required in the operation of my candle filter, and the rounded portion of the core nearest the inlet merely aids in dividing the flow of the liquid prior to its passage through the filter medium and thence to a central duct through which the filtered solution passes to a spinneret or jet.

With further reference to the drawing, the filter there shown by way of illustrating my invention comprises a filter core 10 having a conical-shaped extension 11 at the end opposite the end terminated by the base 12. The exterior surfaces of the core 10 preferably are provided with a series of annular recessions 13 extending along the main body of the core. These recessions may take the form of a plurality of annular grooves or of a thread (screw thread) as shown in the drawing.

The core 10 is joined, preferably removably joined, by any suitable means to the base 12, which may be made of any suitable material such as hard rubber, nylon, steel or other metal, etc., depending, for example, upon the properties of the solution to be filtered and the resistance of the material to attack by the solution. The core 10 may be integral with the base 12, but advantageously is removably attached to the base, for instance in the manner shown in the drawing. Thus, as illustrated, the end portion 14 of the filter core may be screw threaded (external or male screw thread) so that it can be screwed into a recess in the shoulder 15 of the base 12, the said recess being provided with an internal or female screw thread 16. This construction has the advantage that the core 10 (after first removing the surrounding casing or mantle 17) can be readily disengaged for inspection or replacement of the porous filter medium 18 without removing the complete unit from the trunnion holding it. A suitable washer or gasket 19 is interposed between the opposing faces of the shoulder 15 and of the rib 20 of the core 10 prior to use of the filter. This washer or gasket may be formed of any suitable material, e. g., a suitable plastic substance such as polymeric tetrafluoroethylene, polymeric chlorotrifluoroethylene, etc.

The core 10 and the base 12 are provided with a matching central longitudinal duct 21 which extends at one end to the swivel connection 22 in the base 12 and terminates at the other end before the point at which the conical-shaped extension 11 begins, more particularly at one of a plurality (e. g., two, three, four or any desired number) of transverse vents or ducts 23 in the main body portion of the core 10. These transverse vents or ducts permit passage of the liquid out of the central longitudinal duct 21.

The swivel connection 22 and the recess 24 in the base 12 together form means used in holding the filter in a supporting trunnion (not shown).

With further reference to the core 10 the ribs of the annular recessions 13 of the said core are depressed at spaced intervals to form at least one passageway and preferably a plurality of passageways 25 extending along the exterior surfaces of the main body of the core. These passageways advantageously are formed by notching the ribs of the annular recessions 13 at spaced intervals. The passageways 25 extend at one end at least to the point where the transverse vents or ducts 23 appear at the surface of the core 10. The number of passageways 25 usually corresponds to the number of transverse vents or openings in the exterior surfaces of the core.

Before the candle filter is used, a porous filter medium 18 is wrapped about the main body portion of the core 10. Any suitable filter medium may be employed, e. g., one formed of two or three wraps of a cotton batting followed by a sheath of a suitable fabric material. The filter medium 18 is held in place upon the core 10 by any suitable means. For instance, the main body portion of the core may be provided with the annular grooves 26, and the filter medium is then secured at each end around the said annular grooves by means of suitable tie means 27, e. g., a cord, string or the like.

A removable casing or mantle 17 envelops the core 10 and filter medium 18, the portion 28 of this casing which envelops or surrounds the conical-shaped extension 11 having, at least on its inner surface, a conical shape which approximates and preferably corresponds to the conical shape of the extension 11. The casing may be either transparent, translucent or opaque, but in all cases should be formed of a material (e. g., polystyrene, hard rubber, etc.) having sufficient strength to withstand the pressure within the casing during operation of the filter. The portion of the casing which is attached to the base 12 is provided with a female screw thread. The shoulder 15 of the base 12 is provided with a male screw thread 29 so that the base 12 and attached core 10 can be screwed into the threaded portion of the casing 17 as shown at the threaded union 30. The base 12 is provided with a flange 31 which faces the threaded portion 32 of the casing 17. A gasket 33 is interposed between the opposing faces of the flange 31 and the threaded portion 32 of the casing 17. This gasket may be made of any suitable material, e. g., rubber.

In the operation of the filter, the solution to be filtered enters the central longitudinal duct 21 through the opening 34 in the base 12. The solution passes through this duct and thence outwardly through the transverse vents or ducts 23 to the exterior surfaces of the core 10. The solution is carried along the exterior surfaces of the core with the aid of the passageways 25 and through the filter medium 18 before it reaches the annular passageway 35 between the outer part of the filter medium and the inner surface of the casing 17. The solution is carried out of the filter to, for example, a spinneret heading or coupling (not shown) through the passageway 36.

The combination of the conical-shaped extension 11 and the matching interior shape of the casing 17 in that portion thereof which envelops said conical-shaped extension eliminates shoulders and pockets that normally tend to entrap air bubbles in initially installed filters, so that the "bleeding" time necessary to free the candle filter of air is materially decreased. Furthermore, the conical-shaped extension and matching interior surface portion of the casing make possible a greater velocity of the solution as it passes through the filter, thereby further aiding in sweeping out of the filter any adhering bubbles of air that are present therein.

Certain of appended claims are limited by specifying that the number of passageways extending along the main body of the filter core, which passageways are indicated at 25 in Fig. 3 of the accompanying drawing, corresponds to the number of transverse vents in the core. To avoid any misunderstanding as to the meaning intended, it is mentioned that in counting the number of such vents or openings in the core each exit opening, at the surface of the core 10, of the transverse ducts 23 is counted as one. In the candle filter illustrated in the drawing, there are four such vents or openings in the surface of the core at the points where the transverse ducts 23 lead from the central longitudinal duct 21, and four passageways 25 extending along the main body of the filter core.

I claim:

1. An assembly for use in a candle filter comprising a filter core provided with a plurality of transverse vents; a base joined to one end of said core and provided with a swivel connection; a conical-shaped extension at the other end of said core; walls defining a central duct in said core and base, said duct extending at one end to the said swivel connection in said base and terminating at the other end before the point at which said conical-shaped extension begins; and a removable casing about said core, the portion of the said casing enveloping the said extension conforming approximately, at least on its inner surface, to the shape of the said extension.

2. An assembly as in claim 1 wherein the exterior surfaces of the filter core are provided with a series of annular recessions extending along the main body of the said core.

3. An assembly as in claim 2 wherein walls of the said annular recessions are depressed at spaced intervals to form at least one passageway extending along the exterior surfaces of the bain body of the said core.

4. A candle filter comprising a filter core; a base joined to one end of said core and provided with a swivel connection; a conical-shaped extension at the other end of said core; walls defining a central duct in said core and base, said duct extending at one end to the said swivel connection in said base and terminating at the other end before the point at which said conical-shaped extension begins; walls defining a plurality of transverse vents in said filter core; a porous filter medium enveloping said core and removably attached thereto; and a removable casing about said core and filter medium, the portion of the said casing enveloping the said extension having, at least on its inner surface, a conical shape approximating the conical shape of the said extension.

5. An assembly for use in a candle filter comprising a filter core; a base joined to one end of said core and provided with a swivel connection; a conical-shaped extension at the other end of said core; walls defining a central duct in said core and base, said duct extending at one end to the said swivel connection in said base and terminating at the other end before the point at which said conical-shaped extension begins; walls defining a plurality of transverse vents in said filter core, the exterior surfaces of the said core being provided with a series of annular recessions extending along the main body of the said core, said annular recessions being notched at spaced intervals to form passageways extending along the exterior surfaces of the main body of the said core, and said passageways extending at one end at least to the point where said transverse vents appear in the surface of said core, and the number of said passageways corresponding to the number of transverse vents in said core; and a removable casing about said filter core, the portion of the said casing enveloping the said conical-shaped extension conforming approximately, at least on its inner surface, to the shape of the said extension.

6. A candle filter comprising a filter core; a base removably joined to one end of said core and provided with a swivel connection; a conical-shaped extension at the other end of said core; walls defining a central duct in said core and base, said duct extending at one end to the said swivel connection in said base and terminating at the other end before the point at which said conical-shaped extension begins; walls defining a plurality of transverse vents in said filter core, the exterior surfaces of the said core being threaded along most of the main body portion thereof, the ribs of the thread being notched at spaced intervals to form passageways extending along the exterior surfaces of most of the main body of the said core, and said passageways extending at one end at least to the point where the said transverse vents appear in the surface of said core, and the number of said passageways corresponding to the number of transverse vents in said core; annular grooves at the ends of the main body of said core immediately preceding and following the beginning and end, respectively, of the threaded exterior surfaces of said core; a porous filter medium enveloping the main body portion of said core and secured at each end around the said annular grooves; and a removable casing about said core and filter medium, the portion of the said casing enveloping the said extension having, at least on its inner surface, a conical shape corresponding to the conical shape of the said extension.

References Cited in the file of this patent

UNITED STATES PATENTS

| | | |
|---|---|---|
| 702,382 | Topham | June 10, 1902 |
| 1,214,055 | Messer | Jan. 30, 1917 |
| 1,645,364 | Weaver | Oct. 11, 1927 |
| 1,685,775 | Dreaper | Oct. 2, 1928 |
| 1,835,047 | Hill | Dec. 8, 1931 |

FOREIGN PATENTS

| | | |
|---|---|---|
| 27,435 | Great Britain | Sept. 17, 1908 |
| 257,144 | Germany | Feb. 28, 1913 |
| 253,785 | Italy | Mar. 23, 1927 |
| 665,429 | France | Feb. 12, 1931 |
| 669,299 | France | Feb. 12, 1931 |
| 692,168 | Germany | June 14, 1940 |